(12) United States Patent
Carrasco

(10) Patent No.: US 8,330,313 B2
(45) Date of Patent: Dec. 11, 2012

(54) AXIALLY-ADJUSTABLE MAGNETIC BEARING AND A METHOD OF MOUNTING IT

(75) Inventor: Eduardo Carrasco, Gaillon (FR)

(73) Assignee: Societe de Mecanique Magnetique, Saint-Marcel (FR)

( * ) Notice: Subject to any disclaimer, the term of this patent is extended or adjusted under 35 U.S.C. 154(b) by 24 days.

(21) Appl. No.: 13/177,746

(22) Filed: Jul. 7, 2011

(65) Prior Publication Data
US 2012/0025648 A1   Feb. 2, 2012

(30) Foreign Application Priority Data
Jul. 8, 2010   (FR) ...................................... 1055551

(51) Int. Cl.
*H02K 7/09*   (2006.01)
(52) U.S. Cl. ........................................ 310/90.5; 29/898
(58) Field of Classification Search ................. 310/90.5, 310/90; 29/898, 596
See application file for complete search history.

(56) References Cited

U.S. PATENT DOCUMENTS

| | | | | |
|---|---|---|---|---|
| 4,443,043 A | * | 4/1984 | Yamaguchi ................ | 310/90.5 |
| 5,942,825 A | * | 8/1999 | Lee ............................. | 310/90.5 |
| 6,340,855 B1 | * | 1/2002 | Wassenhoven et al. ..... | 310/90.5 |
| 2004/0189124 A1 | | 9/2004 | Baudelocque et al. | |

FOREIGN PATENT DOCUMENTS

| | | |
|---|---|---|
| DE | 19822587 | 11/1999 |
| DE | 19910279 | 9/2000 |

* cited by examiner

*Primary Examiner* — Nguyen N Hanh
(74) *Attorney, Agent, or Firm* — Weingarten, Schurgin, Gagnebin & Lebovici LLP

(57) ABSTRACT

The axially adjustable magnetic bearing comprises an annular body secured to a support, a magnetic bearing stator structure having an annular sheath for supporting electromagnet windings placed concentrically relative to said body, and an annular rotor armature placed concentrically relative to the stator structure, leaving an airgap relative thereto. The annular body includes at least one radial slot associated with clamping means, and includes a set-back portion in its face facing towards the stator structure. The face of the annular body facing towards the stator structure includes a sliding surface that co-operates with a facing portion of said sheath, and the set-back portion of the annular body presents a threaded portion that co-operates with a threaded portion of an adjustment ring engaged in an annular groove formed in the face of the sheath that faces towards the body. The adjustment ring is prevented from moving in the axial direction in said annular groove.

9 Claims, 1 Drawing Sheet

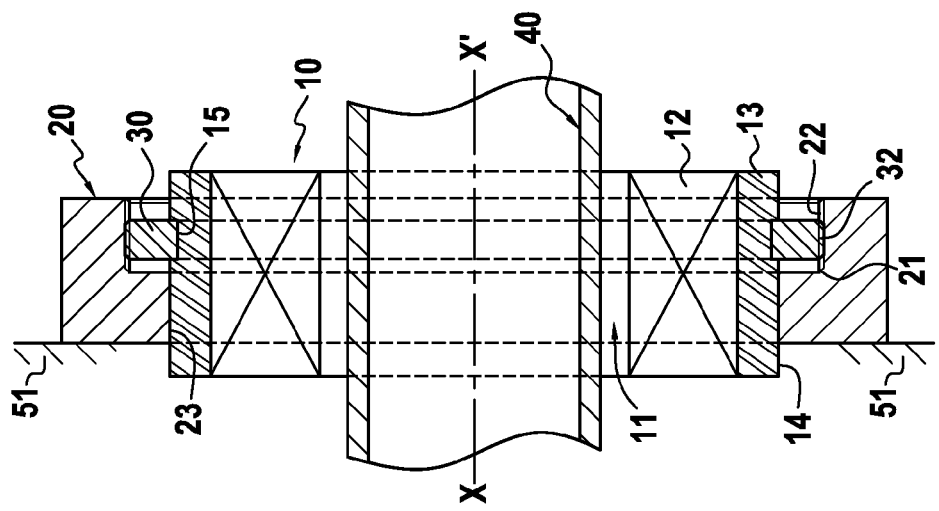
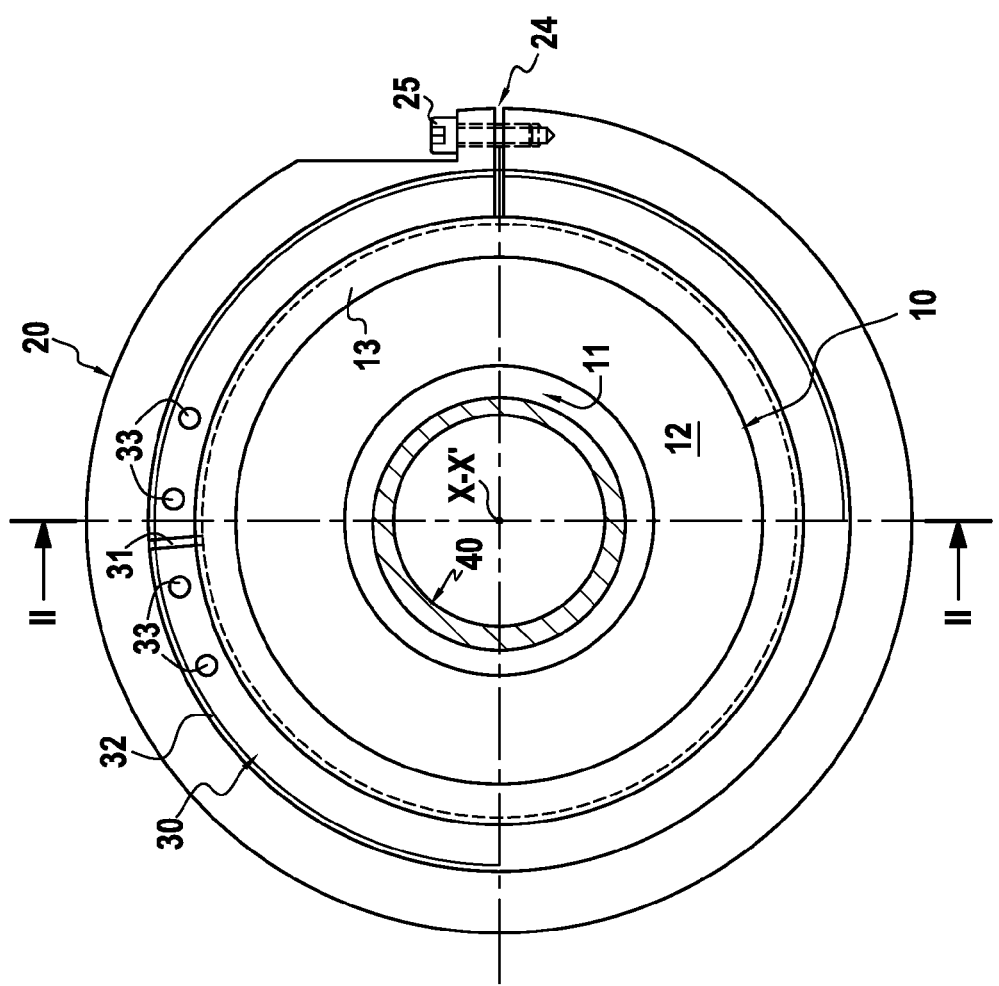

AXIALLY-ADJUSTABLE MAGNETIC BEARING AND A METHOD OF MOUNTING IT

Field of the invention

The present invention relates to an axially adjustable magnetic bearing comprising an annular body secured to a support, a magnetic bearing stator structure having an annular sheath for supporting electromagnet windings placed concentrically relative to said body, and an annular rotor armature placed concentrically relative to the stator structure, leaving an airgap relative thereto.

The invention also provides a method of mounting such a magnetic bearing.

BACKGROUND OF THE INVENTION

Active magnetic bearings are being used more and more in industry because of their numerous advantages, in particular absence of wear, of lubrication, and of pollution, a high speed of rotation, a low level of vibration, and great reliability, even in difficult environmental conditions.

Nevertheless, magnetic bearings require great care during mounting, and in particular it is often necessary to position the various component parts of magnetic bearings with great accuracy relative to a structure.

OBJECTS AND SUMMARY OF THE INVENTION

The present invention seeks to satisfy this problem and to enable a mechanical assembly forming a magnetic bearing to be finely positioned in the axial direction within a support and protection body.

These objects are achieved by an axially adjustable magnetic bearing comprising an annular body secured to a support, a magnetic bearing stator structure having an annular sheath for supporting electromagnet windings placed concentrically relative to said body, and an annular rotor armature placed concentrically relative to the stator structure, leaving an airgap relative thereto, wherein the annular body includes at least one radial slot associated with clamping means, and includes a set-back portion in its face facing towards the stator structure, the face of the annular body facing towards the stator structure including a sliding surface that co-operates with a facing portion of said sheath, and the set-back portion of the annular body presenting a threaded portion that co-operates with a threaded portion of an adjustment ring engaged in an annular groove formed in the face of the sheath that faces towards the body, the adjustment ring being prevented from moving in the axial direction in said annular groove.

According to a particular characteristic, the adjustment ring includes grip means for controlling movement in rotation of said adjustment ring relative to the annular body and to the annular sheath.

The grip means may be constituted by portions in relief formed on a front face of the adjustment ring.

In various particular embodiments, the adjustment ring may be made as a single piece with or without a radial slot, or it may be made as two pieces with two radial slots.

According to a particular characteristic, said clamping means comprise a screw exerting a tangential force on the annular body on either side of said radial slot in the annular body.

In a particular embodiment, the stator structure is interposed between the inner annular rotor armature and the outer annular body.

The invention also provides a method of mounting an axially-adjustable magnetic bearing comprising a magnetic bearing stator structure with an annular sheath supporting electromagnet windings placed concentrically relative to an annular body secured to a support, and an annular rotor armature placed concentrically relative to the stator structure, while leaving an airgap relative thereto, wherein the method comprises the following steps:

a) forming at least one radial slot associated with clamping means in the annular body;

b) forming a sliding surface on the face of the annular body that faces towards the stator structure;

c) forming a set-back portion in the annular body in the face thereof that faces towards the stator structure and providing said set-back portion with a thread;

d) forming an annular groove in the face of the sheath that faces towards the body;

e) inserting an adjustment ring in said annular groove, the ring being dimensioned in such a manner as to be prevented from moving in the axial direction inside said annular groove and presenting a thread that co-operates with said thread of the set-back portion;

f) turning the adjustment ring relative to the sheath and to the annular body in order to position said sheath finely in the axial direction relative to said annular body, while said clamping means are unclamped; and g) after the desired axial position has been obtained for the stator structure relative to the annular body, clamping said clamping means to cause the inside diameter of the annular body to correspond to the outside diameter of the sheath so as to prevent the stator structure from moving axially or radially inside the annular body.

BRIEF DESCRIPTION OF THE DRAWINGS

Other characteristics and advantages of the invention of the invention appear from the following description of particular embodiments, given by way of example, and with reference to the accompanying drawing, in which:

FIG. 1 is a face view of an axially-adjustable magnetic bearing of the invention; and FIG. 2 is a section view on plane II-II of FIG. 1.

MORE DETAILED DESCRIPTION

FIG. 1 shows an example of a radial active magnetic bearing presenting an axis XX' and fitted with axial positioning means in accordance with the invention. A stator structure 10 is placed around an annular rotor armature 40, concentrically about the axis XX', leaving an airgap 11 between the annular armature 40 and the stator structure 10.

The stator structure 10 comprises an annular sheath 13 for supporting electromagnet windings 12 and constituting a yoke of ferromagnetic material for the electromagnet windings 12.

The sheath 13 is engaged in an annular body 20, itself secured to a support 51. The outside surface of the sheath 13 presents a sliding surface 14, and in the vicinity thereof, a peripheral grove 15 in which a circular adjustment ring 30 is housed, which ring, in a particular embodiment, may be provided with at least one radial slot 31 so as to impart a certain amount of resilience thereto enabling it to be inserted in the groove 15. The adjustment ring 30 is dimensioned so as to match the dimensions of the groove 15 and be blocked against moving in either direction along the axis. In the above-mentioned particular embodiment, the adjustment ring 30 retains the possibility of sliding around the stator structure 10 because of its radial slot 31.

The adjustment ring 30 may have more than one radial slot 31, and by way of example it may be made up of two half-rings that are separated by two radial slots. Nevertheless, in another possible embodiment, the adjustment ring 30 need not have any radial slot.

The adjustment ring 30, or the various segments making up the adjustment ring 30 preferably include(s) grip means 33 enabling the user to turn the adjustment ring 30 about the stator structure 10. The grip means 33 may be made by machining or with the help of parts that are fitted on a front face of the adjustment ring 30 and accessible to the user. The grip means 33 may thus be constituted by hollow portions, such as holes, or by portions in relief, such as studs, possibly presenting a section that is circular or polygon, for example.

The adjustment ring 30 is provided with a thread 32 on its outer peripheral vertical surface concentric about the axis XX' in order to co-operate with a thread 22 formed on the inner peripheral cylindrical surface concentric about the axis XX' of a set-back portion 21 of the body 20 that is fastened to the support 51.

The annular body 20 includes a radial slot 24 associated with clamping means 25 such as a screw exerting a tangential force on the annular body on either side of the radial slot 24.

The annular body 20 includes a set-back portion 21 in its face facing towards the stator structure 10, this set-back portion 21 being provided with a thread 22 as mentioned above. The face of the annular body 20 that faces towards the stator structure 10 and that is adjacent to the set-back portion 21 includes a sliding surface 23 that co-operates with the sliding surface 14 defined on the outside face of the sheath 13.

Fine positioning in the axial direction of the mechanical assembly constituting the stator structure 10 of a magnetic bearing within the body 20 is performed as follows:

With the screw 25 loose so as to allow the body 20 with its radial slot 24 to present a small amount of clearance in the radial direction, it is possible to insert the adjustment ring 30 in the groove 15 while engaging the outside thread 32 on the adjustment ring 30 with the inside thread 22 of the set-back portion 21 of the body 20.

Once the adjustment ring 30 has been engaged in the groove 15, with movement in translation being prevented in both axial directions, clearance is allowed to remain that makes it possible to turn the adjustment ring 30 around the axis XX', with the thread 32 of the adjustment ring 30 being engaged with the thread 22 of the body 20, where appropriate after the screw 25 has been tightened a little, but not fully.

In order to adjust the axial position of the stator structure 10 finely, the user causes the adjustment ring 30 to turn about the axis XX' by making use of the grip means 33. During this adjustment, because of the co-operation between the threads 22 and 32, and because of the co-operation between the sliding surfaces 14 and 23, the stator structure 10 moves relative to the body 20 along the axial direction XX'. Once the precise position has been obtained, the tangential screw 25 is tightened to close the radial slot 24 of the body 20. While the screw 25 is being tightened, the inside diameter of the body 20 becomes smaller until it reaches the outside diameter of the sheath 13 so that no clearance remains between the sliding surfaces 14 and 23, thereby preventing the stator structure 10 from moving within the body whether in the axial direction or in the radial direction.

The adjustment system is naturally reversible, such that after being in operation for a certain length of time and during a maintenance operation, if it is observed that the axial position of the stator structure 10 needs to be modified, then it suffices to loosen the screw 25 and to repeat the above-described operations until the new desired axial position is obtained, after which the screw 25 should be retightened so as to block the newly selected axial position.

What is claimed is:

1. An axially adjustable magnetic bearing comprising an annular body secured to a support, a magnetic bearing stator structure having an annular sheath for supporting electromagnet windings placed concentrically relative to said body, and an annular rotor armature placed concentrically relative to the stator structure, leaving an airgap relative thereto, wherein the annular body includes at least one radial slot associated with clamping means, and includes a set-back portion in its face facing towards the stator structure, the face of the annular body facing towards the stator structure including a sliding surface that co-operates with a facing portion of said sheath, and the set-back portion of the annular body presenting a threaded portion that co-operates with a threaded portion of an adjustment ring engaged in an annular groove formed in the face of the sheath that faces towards the body, the adjustment ring being prevented from moving in the axial direction in said annular groove.

2. A bearing according to claim 1, wherein the adjustment ring includes grip means for controlling movement in rotation of said adjustment ring relative to the annular body and to the annular sheath.

3. A bearing according to claim 2, wherein the grip means are constituted by portions in relief formed on a front face of the adjustment ring.

4. A bearing according to claim 2, wherein the grip means are constituted by hollow portions formed in a front face of the adjustment ring.

5. A bearing according to claim 1, wherein the adjustment ring includes at least one radial slot.

6. A bearing according to claim 1, wherein the adjustment ring includes two radial slots and is made as two portions.

7. A bearing according to claim 1, wherein said clamping means comprise a screw exerting a tangential force on the annular body on either side of said radial slot in the annular body.

8. A bearing according to claim 1, wherein the stator structure is interposed between the inner annular rotor armature and the outer annular body.

9. A method of mounting an axially-adjustable magnetic bearing comprising a magnetic bearing stator structure with an annular sheath supporting electromagnet windings placed concentrically relative to an annular body secured to a support, and an annular rotor armature placed concentrically relative to the stator structure, while leaving an airgap relative thereto, wherein the method comprises the following steps:
   a) forming at least one radial slot associated with clamping means in the annular body;
   b) forming a sliding surface on the face of the annular body that faces towards the stator structure;
   c) forming a set-back portion in the annular body in the face thereof that faces towards the stator structure and providing said set-back portion with a thread;
   d) forming an annular groove in the face of the sheath that faces towards the body;
   e) inserting an adjustment ring in said annular groove, the ring being dimensioned in such a manner as to be prevented from moving in the axial direction inside said annular groove and presenting a thread that co-operates with said thread of the set-back portion;

f) turning the adjustment ring relative to the sheath and to the annular body in order to position said sheath finely in the axial direction relative to said annular body, while said clamping means are unclamped; and g) after the desired axial position has been obtained for the stator structure relative to the annular body, clamping said clamping means to cause the inside diameter of the annular body to correspond to the outside diameter of the sheath so as to prevent the stator structure from moving axially or radially inside the annular body.

* * * * *